(12) United States Patent
Ando et al.

(10) Patent No.: US 9,254,868 B2
(45) Date of Patent: Feb. 9, 2016

(54) DISPLACEMENT DETECTION APPARATUS FOR LINEAR MOTION MECHANISM AND REAR WHEEL STEERING APPARATUS FOR VEHICLE INCLUDING THE SAME

(71) Applicant: AISIN SEIKI KABUSHIKI KAISHA, Kariya-shi (JP)

(72) Inventors: Shinsuke Ando, Anjo (JP); Naoya Yoshizawa, Anjo (JP); Shimpei Fujii, Anjo (JP); Yusuke Akagi, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 70 days.

(21) Appl. No.: 14/289,827

(22) Filed: May 29, 2014

(65) Prior Publication Data
US 2014/0353071 A1    Dec. 4, 2014

(30) Foreign Application Priority Data

May 29, 2013  (JP) ................................. 2013-112510
May 29, 2013  (JP) ................................. 2013-112515

(51) Int. Cl.
*B62D 15/02*  (2006.01)
*B60G 17/019*  (2006.01)
(Continued)

(52) U.S. Cl.
CPC .......... *B62D 15/0225* (2013.01); *B60G 17/019* (2013.01); *B62D 7/146* (2013.01); *G01B 7/14* (2013.01); *G01D 5/145* (2013.01); *B60G 2202/422* (2013.01); *B60G 2204/11* (2013.01)

(58) Field of Classification Search
CPC .. B62D 5/0418; B62D 5/0481; B62D 5/0421; B62D 5/0424; B62D 5/0427; B62D 5/0442; B62D 5/0445; B62D 5/0448; B62D 5/0451; B62D 5/0457; B62D 5/046; B62D 5/0463; B62D 15/0225; G01B 7/14; B01D 5/145
See application file for complete search history.

(56) References Cited

U.S. PATENT DOCUMENTS

| 4,853,672 A | * | 8/1989 | Yasuda | ................ B62D 15/023 180/400 |
| 4,944,356 A | | 7/1990 | Oslapas | |

(Continued)

FOREIGN PATENT DOCUMENTS

| EP | 0 376 456 A2 | 7/1990 |
| EP | 2 130 744 A1 | 12/2009 |

(Continued)

OTHER PUBLICATIONS

Extended European Search Report issued on Nov. 24, 2014, by the European Patent Office in corresponding European Patent Application No. 14170166.4-1558. (5 pages).

*Primary Examiner* — Anne Marie Boehler
*Assistant Examiner* — Maurice Williams
(74) *Attorney, Agent, or Firm* — Buchanan Ingersoll & Rooney PC

(57) ABSTRACT

A displacement detection apparatus for a linear motion mechanism includes a nut member, a rod including elongate grooves elongating in an axial direction of the rod and a through hole, a permanent magnet disposed parallel to the rod, a magnet block made of synthetic resin and including a retaining portion holding the permanent magnet, a pair of leg portions extending from ends of the retaining portion that are spaced apart, and a nut made of metal insert-molded at an intermediate position between the pair of leg portions, and a displacement sensor disposed opposing to the permanent magnet. The pair of leg portions and the nut of the magnet block are disposed in the elongate groove of the rod and the magnet block is fixed to the rod by a bolt screwed to the nut, the bolt penetrating through the through hole extending through the rod.

8 Claims, 8 Drawing Sheets

(51) Int. Cl.
*G01D 5/14* (2006.01)
*B62D 7/14* (2006.01)
*G01B 7/14* (2006.01)

(56) References Cited

U.S. PATENT DOCUMENTS

| | | | | |
|---|---|---|---|---|
| 5,083,626 A | * | 1/1992 | Abe | B60G 7/006 180/412 |
| 5,234,068 A | * | 8/1993 | Kohata | B62D 15/0225 180/413 |
| 5,791,432 A | | 8/1998 | Fushimi et al. | |
| 6,163,746 A | * | 12/2000 | Moerbe | G01D 5/145 324/207.11 |
| 2001/0003435 A1 | | 6/2001 | Okumura | |
| 2002/0050417 A1 | * | 5/2002 | Berg | B62D 15/0225 180/446 |
| 2003/0051938 A1 | * | 3/2003 | Menjak | B62D 5/008 180/444 |
| 2005/0098376 A1 | * | 5/2005 | Ozsoylu | B62D 5/0421 180/444 |
| 2006/0086560 A1 | * | 4/2006 | Furusho | B62D 5/0463 180/446 |
| 2006/0170415 A1 | * | 8/2006 | Budaker | B62D 15/02 324/207.13 |
| 2007/0107975 A1 | * | 5/2007 | Onishi | B62D 5/0403 180/444 |
| 2008/0271942 A1 | * | 11/2008 | Yamashita | B62D 5/04 180/443 |
| 2010/0019465 A1 | | 1/2010 | Yuta et al. | |
| 2010/0318264 A1 | * | 12/2010 | Maeda | B62D 5/001 701/42 |
| 2011/0106382 A1 | * | 5/2011 | Kageyama | B62D 5/008 701/42 |
| 2012/0199413 A1 | * | 8/2012 | Fujinori | B62D 3/12 180/445 |
| 2013/0030653 A1 | * | 1/2013 | Soos | B62D 5/0424 701/41 |
| 2013/0141081 A1 | * | 6/2013 | Pfaffinger | G01D 5/14 324/207.12 |
| 2013/0245992 A1 | * | 9/2013 | Servel | G01B 7/14 702/150 |
| 2014/0353067 A1 | * | 12/2014 | Fujii | B62D 5/0406 180/444 |
| 2015/0123366 A1 | * | 5/2015 | Kuhnt | B62D 5/0445 280/86.75 |

FOREIGN PATENT DOCUMENTS

JP 3601170 B2 12/2004
JP 5098242 B2 12/2012

* cited by examiner

F I G. 12
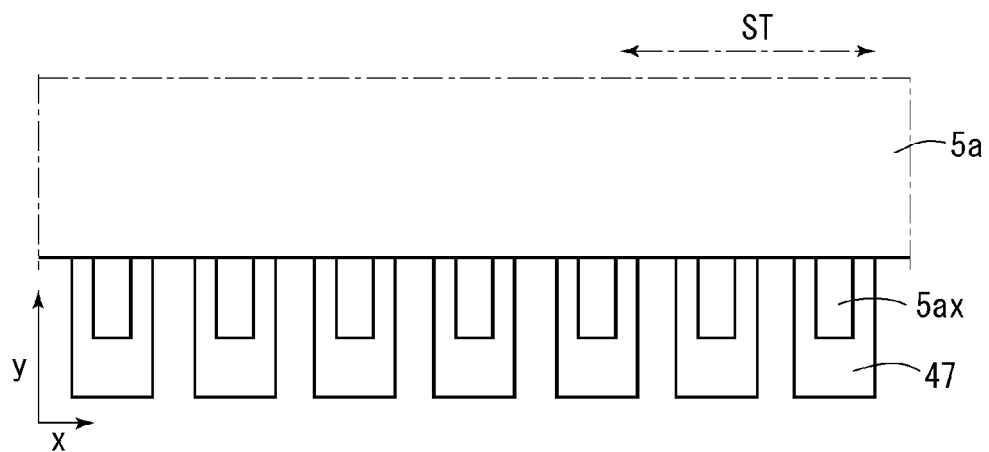

DISPLACEMENT DETECTION APPARATUS FOR LINEAR MOTION MECHANISM AND REAR WHEEL STEERING APPARATUS FOR VEHICLE INCLUDING THE SAME

CROSS REFERENCE TO RELATED APPLICATIONS

This application is based on and claims priority under 35 U.S.C. §119 to Japanese Patent Application 2013-112510, filed on May 29, 2013 and to Japanese Patent Application 2013-112515, filed on May 29, 2013 the entire content of which are incorporated herein by reference.

TECHNICAL FIELD

This disclosure generally relates to a displacement detection apparatus for a linear motion mechanism and a rear wheel steering apparatus for a vehicle including the displacement detection apparatus for the linear motion mechanism.

BACKGROUND DISCUSSION

A linear motion mechanism including a nut member and a rod that screws through the nut member and converting rotational movement of the nut member into linear movement is generally known. In addition, a displacement detection apparatus for detecting displacement of the rod in the axial direction of the rod is known. As an example, a known linear motion mechanism serving as a driving mechanism that drives a rod in a rear wheel steering apparatus composing a portion of a four wheel steering (4WS) system for a vehicle is disclosed in JP5098242B, hereinafter referred to as Reference 1. Various rear wheel steering apparatuses, each of which is composing a portion of a four wheel steering (4WS) system for a vehicle, are known. Fundamentally, each of such rear wheel steering apparatuses includes a rod that connects to rear wheels of a vehicle, a housing supporting the rod, the housing to be fixed to a chassis of a vehicle, and a motor housed in the housing, the motor for driving the rod to steer the rear wheels, as disclosed in Reference 1. A similar rear wheel steering apparatus disclosed in JP3601170B, hereinafter referred to as Reference 2, includes a rear wheel steering sensor, which corresponds to a displacement detection apparatus, for detecting displacement of a rack shaft so as to detect an absolute steering amount of rear wheels.

In Reference 2, the rear wheel steering sensor is described as including a hall IC. The rear wheel steering sensor outputs a signal indicating a steering position corresponding to moving amount of a permanent magnet attached to the rack shaft. The permanent magnet is illustrated in FIG. 2 in Reference 2, however, how the permanent magnet is attached relative to the rack shaft, which corresponds to the rod, is not described. Commonly, an adhesive is used as a bonding means. In addition, as a means for preventing the rack shaft, which corresponds to the rod, from rotating, a key groove is formed on the rod and a key is attached to the key groove, commonly. Normally, the key groove and the key are provided separately from the rear wheel steering sensor. Alternatively, the rod and the housing supporting the rod are provided with splines so as to prevent the rod from rotating and so as to allow movement in the axial direction only. In either case, the displacement detection apparatus is not related to the means for preventing the rod from rotating, and commonly they are separately designed.

In the rear wheel steering apparatus disclosed in Reference 1, the housing of a motor and the housing of a speed reducing mechanism are threadably mounted together and the housing of the speed reducing mechanism and a cover is fastened by a locknut. A displacement detection apparatus is additionally attached thereto. As a result, number of components increases, assembly becomes difficult and cost reduction becomes difficult. In Reference 2, the rear wheel steering sensor is integrated into a servo unit, however, the servo unit is a component separately provided from the housing. As a result, number of components increases and cost reduction becomes difficult.

A need thus exists for a displacement detection apparatus for a linear motion mechanism and rear wheel steering apparatus for a vehicle including the displacement detection apparatus for the linear motion mechanism, which are not susceptible to the drawbacks mentioned above.

SUMMARY

A displacement detection apparatus for a linear motion mechanism includes a nut member, a rod that screws through the nut member, the rod including elongate grooves elongating in an axial direction of the rod and a through hole extending between the elongate grooves, the linear motion mechanism converting rotational movement of the nut member into linear movement of the rod, a permanent magnet disposed parallel to the rod, a magnet block made of synthetic resin and including a retaining portion holding the permanent magnet, a pair of leg portions extending from ends of the retaining portion that are spaced apart in the axial direction, and a nut made of metal that is insert-molded at an intermediate position between the pair of leg portions, and a displacement sensor disposed opposing to the permanent magnet and detecting displacement of the rod in the axial direction. The pair of leg portions and the nut of the magnet block are disposed in the elongate groove of the rod and the magnet block is fixed to the rod by a bolt screwed to the nut, the bolt penetrating through the through hole extending through the rod.

A rear wheel steering apparatus for a vehicle includes a housing that connects to a suspension mechanism for supporting rear wheels of the vehicle via a first connecting member and a second connecting member, an electric motor housed in a tubular body composing a portion of the housing, a speed reducing mechanism housed in the tubular body and reducing speed of an output from the electric motor, a nut member that connects to the speed reducing mechanism and rotating, a rod that screws through the nut member, the rod that connects to the second connecting member, the linear motion mechanism converting rotational movement of the nut member into linear movement of the rod, a case composing a portion of the housing, the case disposed to surround the rod and fixedly connecting to the tubular body, the rod including elongate grooves elongating in an axial direction of the rod and a through hole extending between the elongate grooves, a permanent magnet disposed parallel to the rod, and a magnet block made of synthetic resin and including a retaining portion holding the permanent magnet, a pair of leg portions extending from ends of the retaining portion that are spaced apart in the axial direction, and a nut made of metal that is insert-molded at an intermediate position between the pair of leg portions. The pair of leg portions and the nut of the magnet block are disposed in the elongate groove of the rod and the magnet block is fixed to the rod by a bolt screwed to the nut, the bolt penetrating through the through hole extending through the rod.

BRIEF DESCRIPTION OF THE DRAWINGS

The foregoing and additional features and characteristics of this disclosure will become more apparent from the following detailed description considered with the reference to the accompanying drawings, wherein:

FIG. 12 is a plan view drawing illustrating the displacement detection apparatus according to the embodiment in which boding state of leads of a detection sensor and the lands of the electronic circuit board is enlarged;

DETAILED DESCRIPTION

Figure 1:
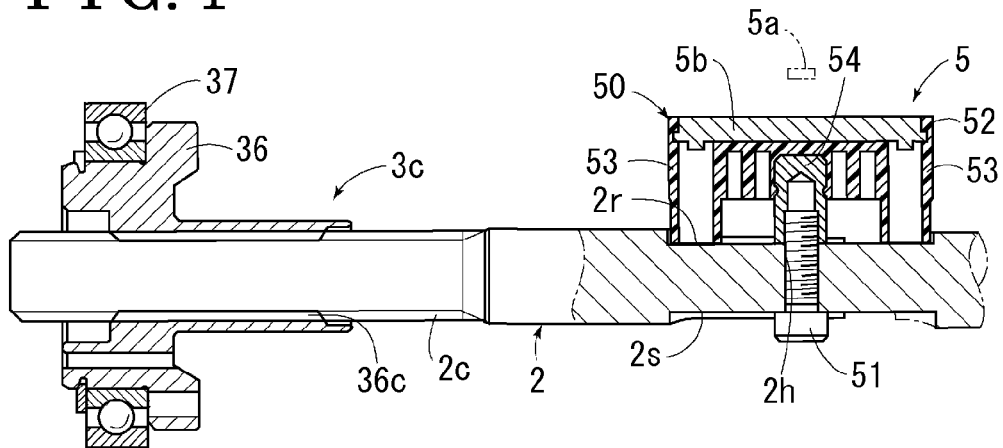
FIG. 1 is an axial direction cross-sectional view drawing illustrating a linear motion mechanism and a displacement detection apparatus according to an embodiment disclosed here.

A displacement detection apparatus 5 for a linear motion mechanism 3c according to an embodiment disclosed here will be described referring to FIGS. 1 through 12. As FIG. 1 illustrates, the linear motion mechanism 3c includes a nut member 36 that makes rotational movement and a rod 2 that screws through the nut member 36. The linear motion mechanism 3c converts rotational movement of the nut member 36 into linear movement of the rod 2. The linear motion mechanism 3c may be referred to as a screw mechanism. The displacement detection apparatus 5 according to the embodiment is for detecting displacement of the rod 2 in the axial direction of the rod 2. The displacement detection apparatus 5 includes a displacement sensor 5a and a permanent magnet 5b. The permanent magnet 5b is retained in a magnet block 50. The linear motion mechanism 3c is mounted on a rear wheel steering apparatus, which will be described later. The nut member 36 is rotatably supported by a bearing 37 and the rod 2 is attached so as to penetrate through a case 12. An example of the displacement sensor 5a is a magnetic vector sensor. The displacement sensor 5a is disposed at a position opposing to the permanent magnet 5b as illustrated in two dot chain lines in FIG. 1. More specifically, the displacement sensor 5a is disposed on a central portion of an electronic circuit board 40 within a region facing a path of movement of the permanent magnet 5b so as to detect magnetic flux changes of the permanent magnet 5b.

Figure 2:
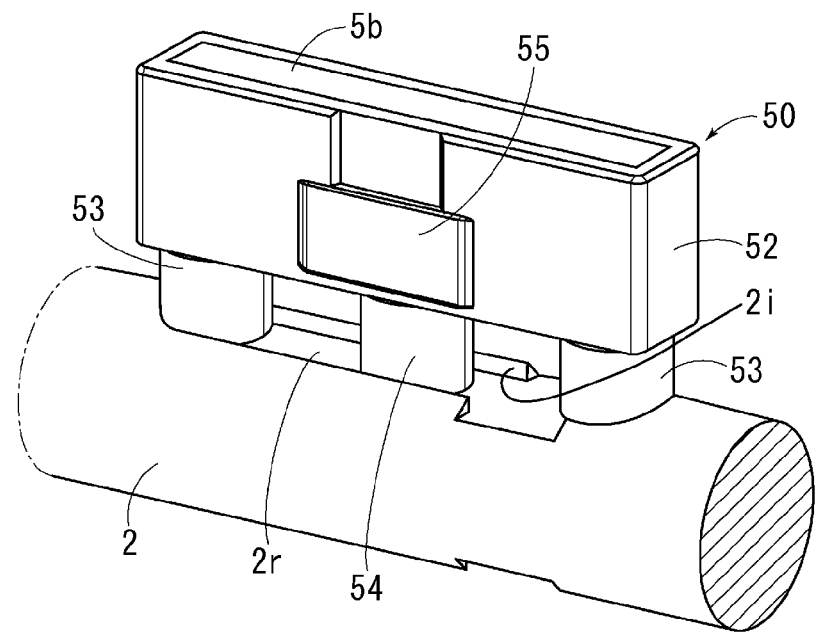
FIG. 2 is a perspective view drawing illustrating the displacement detection apparatus according to the embodiment in which a portion where a magnet block is attached is enlarged.

As FIGS. 1 and 2 illustrate, elongate grooves 2r, 2s elongating in the axial direction are formed on the rod 2 so as to form opposing surfaces on the rod 2. The elongate grooves 2r, 2s are substantially rectangular recessed portions. A through hole 2h extends between the elongate grooves 2r, 2s. The magnet block 50 is positioned at one of the elongate grooves 2r, 2s, which is the elongate groove 2r. A bolt 51 is inserted through the through hole 2h from the elongate groove 2s on the opposite side and threadably mounted to a nut 54 so as to retain the magnet block 50 on the rod 2. The elongate groove 2s is formed to have identical form as the elongate groove 2r in consideration of ease at the time of assembly, however, the elongate groove 2s may be formed in a form other than a rectangular recessed portion as long as the elongate groove 2s receives the bolt 51 therein.

Figure 3:
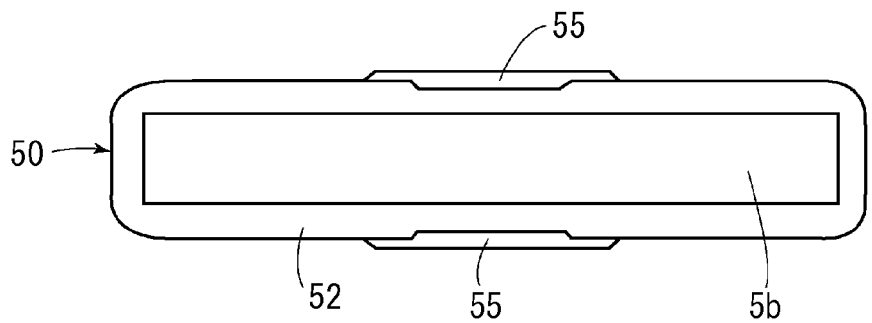
FIG. 3 is a plan view drawing illustrating the magnet block of the displacement detection apparatus according to the embodiment.
Figure 4:
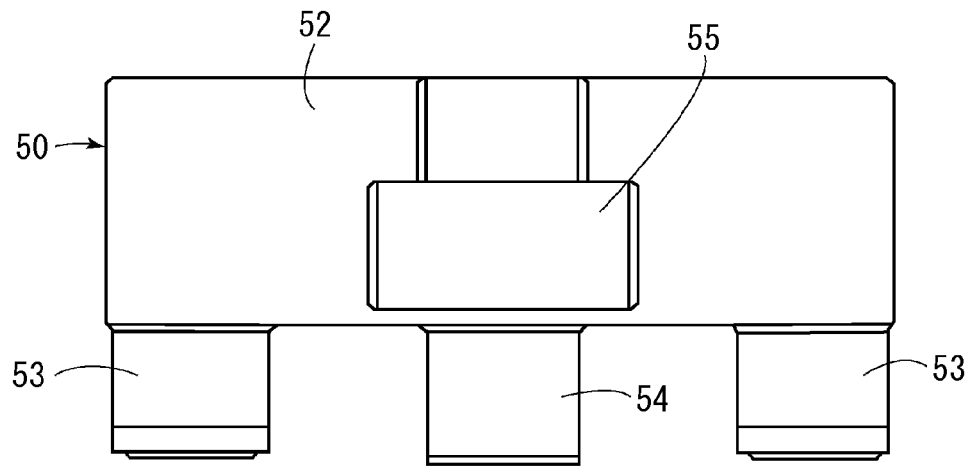
FIG. 4 is an elevation view drawing illustrating the magnet block of the displacement detection apparatus according to the embodiment.
Figure 5:
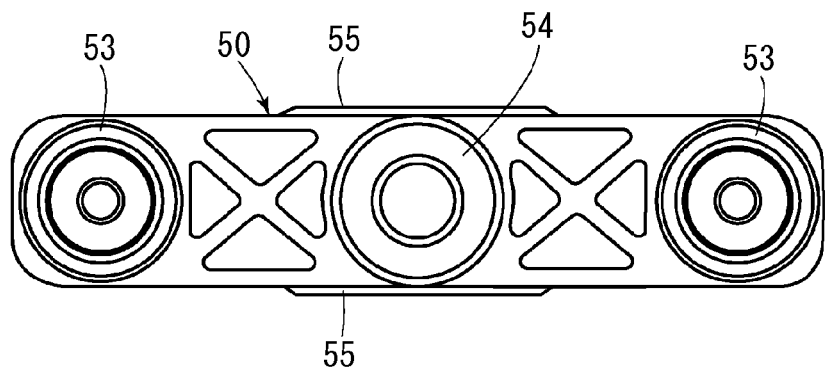
FIG. 5 is a drawing viewed from a direction opposite from the plan view illustrating the magnet block of the displacement detection apparatus according to the embodiment.
Figure 6:
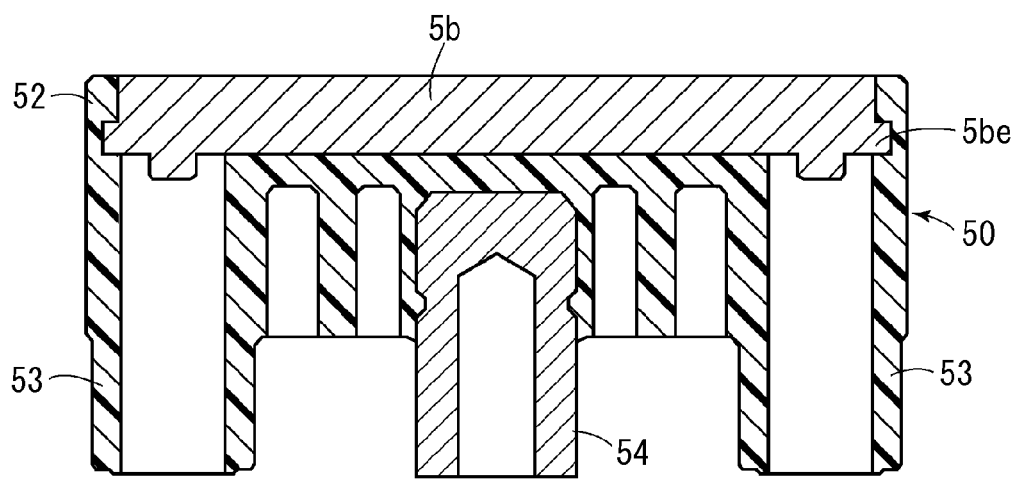
FIG. 6 is a longitudinal direction cross-sectional view drawing illustrating the magnet block of the displacement detection apparatus according to the embodiment.
Figure 7:
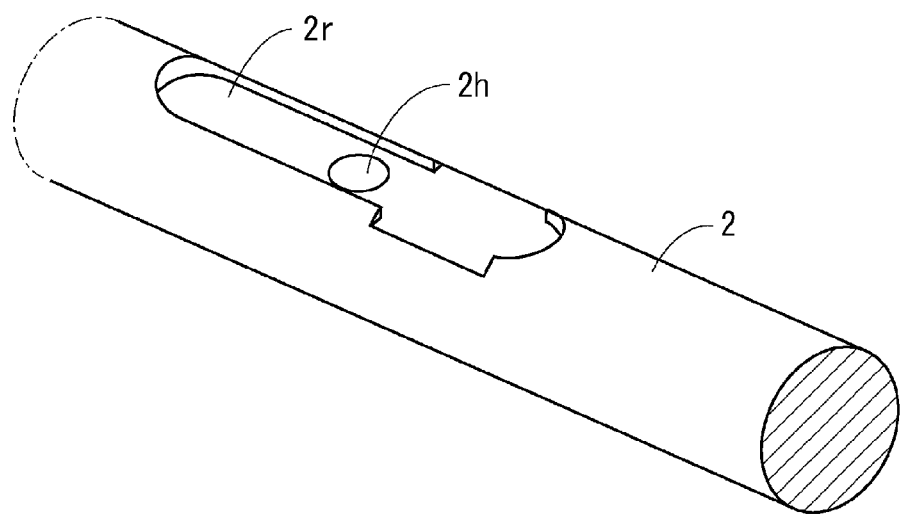
FIG. 7 is a perspective view drawing illustrating a portion of a rod in the displacement detection apparatus according to the embodiment.

The magnet block 50, which is made of synthetic resin, is formed in an exterior form illustrated in FIGS. 3 to 5. As FIG. 6 illustrates, the magnet block 50 is formed so as to include a retaining portion 52 holding the permanent magnet 5b and a pair of leg portions 53 extending from ends of the retaining portion 52 spaced apart in the longitudinal direction of the magnet block 50. In a state where the magnet block 50 is retained on the rod 2, the longitudinal direction corresponds to the axial direction of the rod 2. In addition, the nut 54, which is made of metal, is inserted-molded at an intermediate position between the pair of leg portions 53 so as to form a part of the magnet block 50. A neodymium magnet is an example of the permanent magnet 5b. The permanent magnet 5b includes protrusions 5b e that are formed to extend in the axial direction from ends of the permanent magnet 5b spaced apart in the axial direction. The retaining portion 52 and the permanent magnet 5b including the protrusions 5b e are integrally formed so that the permanent magnet 5b is rigidly retained to the retaining portion 52. In addition, the magnet block 50 is formed with protruding portions 55 on each of side surfaces of the retaining portion 52 at a portion where the nut 54 is insert-molded.

Figure 9:
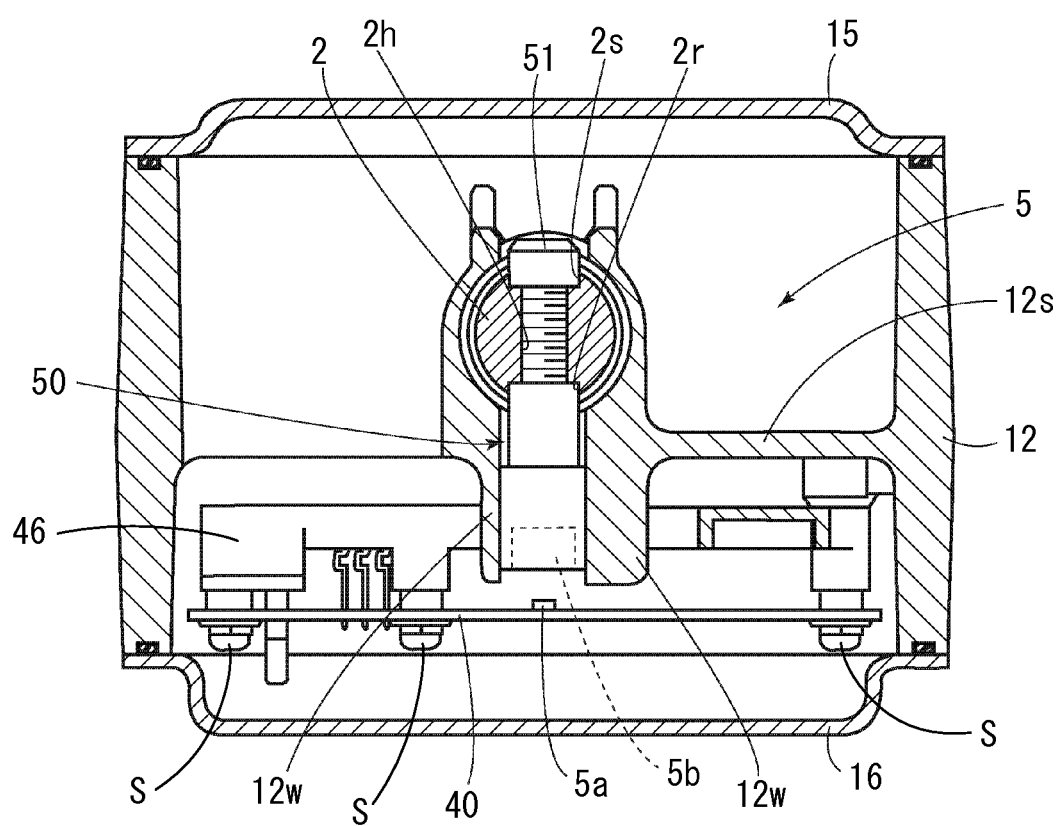
FIG. 9 is a cross-sectional view drawing viewed from a direction perpendicular to the axial direction illustrating the case and the displacement detection apparatus that are provided for the linear motion mechanism according to the embodiment.

The magnet block 50 is retained on the rod 2, which is mounted in a case 12 of a rear wheel steering apparatus illustrated in FIG. 9, which will be described later. As FIGS. 1 and 2 illustrate, the leg portions 53 of the magnet block 50 and the nut 54 are fitted to the elongate groove 2r of the rod 2, and the bolt 51 that is inserted through the through hole 2h of the rod 2 is threadably mounted to the nut 54. Accordingly, the rotational force that applies on the nut 54, the rotational force that results from the rotation of the bolt 51, is absorbed by the leg portions 53 being in contact with the inner side surface 2i of the elongate groove 2r. As a result, the magnet block 50 is reliably retained parallel to the rod 2 without the magnet block 50 rotating with the nut 54 as the center of rotation. In other words, the leg portions 53 serve to define position of the permanent magnet 5b relative to the rotational direction of the bolt 51. Accordingly, a single set of the bolt 51 and the nut 54 alone serves to fasten the magnet block 50 to the rod 2. As a result, the component numbers are reduced compared to general methods of retaining a magnet block on a rod that use two or more sets of bolts and nuts.

Figure 8:
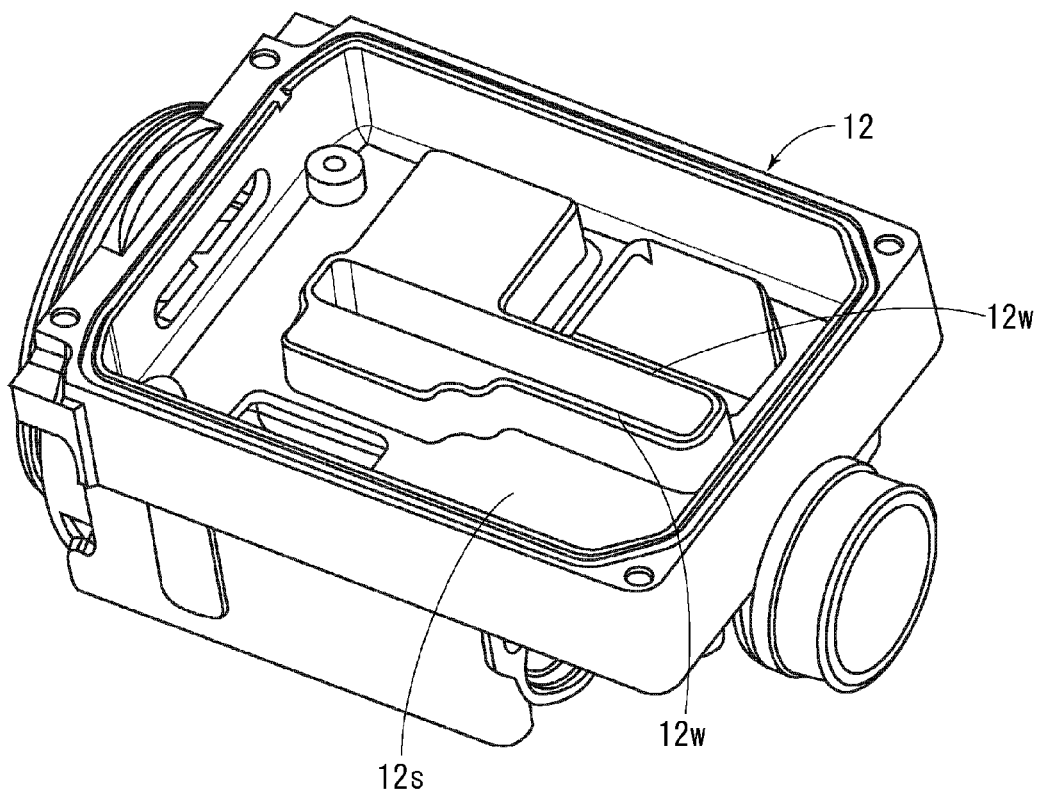
FIG. 8 is a perspective view drawing illustrating a case that is provided for the linear motion mechanism according to the embodiment.

As FIG. 8 illustrates, a support portion 12s is formed inside the case 12. In addition, the case 12 includes a pair of standing wall portions 12w extending parallel to the axis of the rod 2 that is inserted through the case 12. The protruding portions 55 of the magnet block 50 are fitted between the standing wall portions 12w and the bolt 51, which is inserted through the through hole 2h of the rod 2, is threadably mounted to the nut 54. Accordingly, as FIG. 9 illustrates, the rod 2 is retained by the magnet block 50 in a state restrained from rotating relative to the standing wall portions 12w, in other words relative to the case 12. The load that the magnet block 50 is required to withstand for restraining the rod 2 from rotating relative to the standing wall portions 12w concentrates at the protruding portions 55, which is at the portion of the nut 54 that is made of metal. Accordingly, the retaining portion 52 and the permanent magnet 5b are prevented from receiving a large load, so that an accurate detection precision may be maintained. Other reference numerals in FIG. 9 that are not mentioned in the above description are as same as the reference numerals for describing the components of the rear wheel steering apparatus that will be described later. The components provided with such reference numerals in FIG. 9 will be described later in relation to a structure for supporting the displacement sensor 5a.

Figure 10:
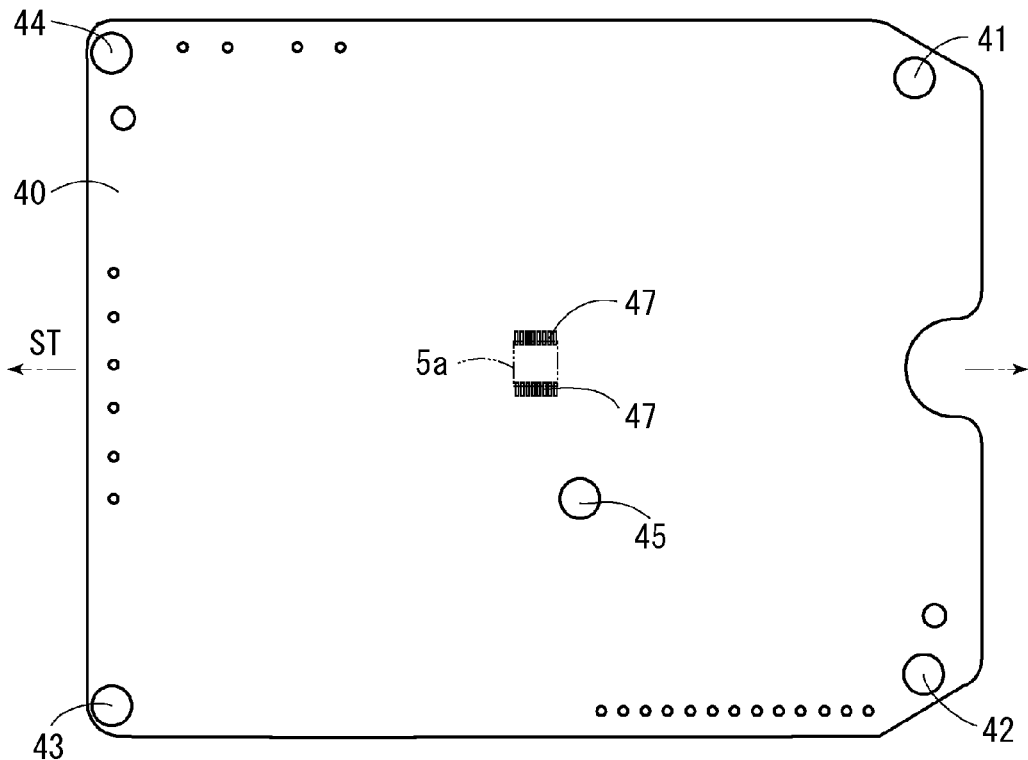
FIG. 10 is a plan view drawing illustrating an electronic circuit board for the displacement detection apparatus according to the embodiment.
Figure 11:
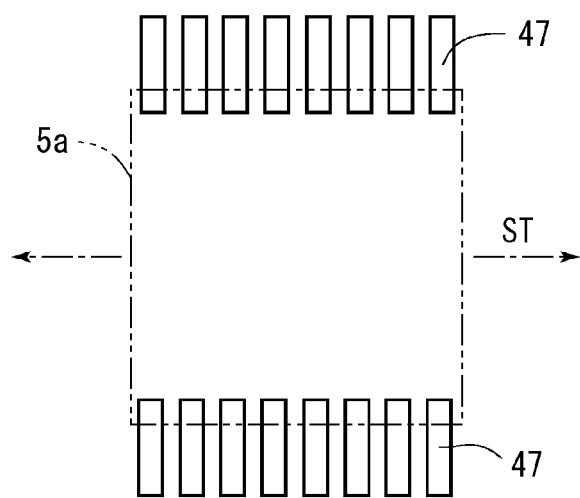
FIG. 11 is a plan view drawing illustrating the electronic circuit board for the displacement detection apparatus according to the embodiment in which a portion where lands are provided is enlarged.

On the electronic circuit board 40, plural elements are mounted and the displacement sensor 5a is disposed at the central portion of the electronic circuit board 40. As FIG. 10 illustrates, screw holes 41, 42, 43, 44, 45 are formed to extend through the electronic circuit board 40 and screws S are inserted into the screw holes 41, 42, 43 44, 45 as FIG. 9 illustrates. Accordingly, the electronic circuit board 40 is fixed to a support base plate 46 at a position spaced by a predetermined distance relative to the support base plate 46. More specifically, the screw hole 45 is provided at a position close to the displacement sensor 5a. The electronic circuit board 40 is screw-fixed to the support base plate 46 at the position of the screw hole 45 in addition to the screw holes 41, 42, 43, 44 that are provided at four corners of the electronic circuit board 40. As a result, the displacement sensor 5a is supported in a stable state.

As FIG. 12, which is an enlarged view drawing of the electronic circuit board 40, illustrates, the displacement sensor 5a includes plural leads 5ax extending parallel to each other in a predetermined direction. The electronic circuit board 40 includes plural lands 47 extending parallel to each other in a predetermined direction corresponding to the leads 5ax. Likewise to generally known mounting methods, each of the lands 47 is provided with an area larger than each of the leads 5ax in order to compensate for errors at the time of bonding the leads 5ax and the lands 47. More specifically, the difference in sizes between the lead 5ax and the land 47 in a longitudinal direction, which is in y-direction in FIG. 12, is approximately four times of the difference in sizes between the lead 5ax and the land 47 in a width direction, which is in x-direction in FIG. 12. The allowed mounting error is proportional to the difference in sizes in each direction. In the displacement detection apparatus 5 for the linear motion mechanism 3c according to the embodiment, the electronic circuit board 40 is screw-fixed to the support base plate 46 in a state where the plural leads 5ax extending parallel to each other and the plural lands 47 extending parallel to each other extend in the direction perpendicular to the moving direction ST of the permanent magnet 5b, which is the direction of the stroke of the rod 2, in other words the y-direction in FIG. 12. As a result, the detection errors for the displacement of the permanent magnet 5b and for the displacement of the rod 2 are reduced to minimum so that an accurate detection precision may be maintained. Other reference numerals in FIG. 1 and FIG. 9 that are not mentioned in the above description are as same as the reference numerals for describing the components of the rear wheel steering apparatus, which will be described later. The components provided with such reference numerals in FIGS. 1 and 9 will be described later in this disclosure.

Figure 13:
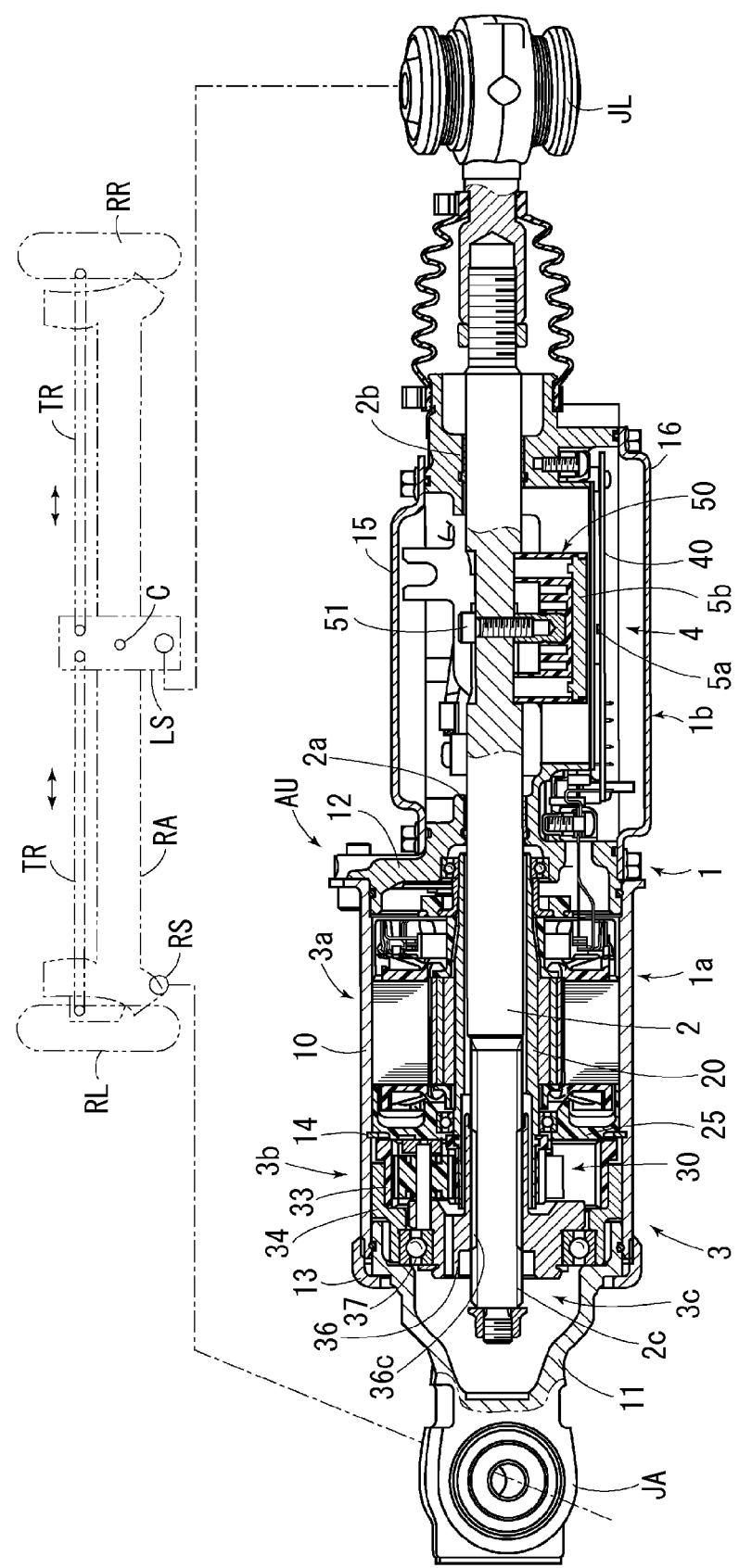
FIG. 13 is an axial direction cross-sectional view drawing illustrating a configuration of a rear wheel steering apparatus according to an embodiment disclosed here as a whole.

The rear wheel steering apparatus including the displacement detection apparatus 5 arranged in the abovementioned configuration according to an embodiment will be described next referring to FIGS. 13 through 15. The rear wheel steering apparatus according to the embodiment is an apparatus composing a portion of a four wheel steering (4WS) system. The front wheel steering system is similar to a known system and description of which will be omitted. Various suspension mechanisms for supporting rear wheels of a vehicle are known. A suspension mechanism according to the embodiment is configured as illustrated in FIG. 13 with two-dot chain lines. The suspension mechanism includes a rear axle RA supporting the rear wheels RL, RR of a vehicle, a retaining portion RS on the rear axle RA, and a link LS that is axially supported on the rear axle RA so as to rotate with a rotation center C as the center of rotation. An actuator unit AU, which is a component of the rear wheel steering apparatus according to the embodiment, is disposed between the retaining portion RS and the link LS. Accordingly, the portion between the retaining portion RS and the link LS is driven to expand and contract so as to steer the rear wheels RL, RR via tie rods TR in response to the rotating movement of the link LS.

In the actuator unit AU, the rod 2 is supported by a housing 1 so as to be linearly movable in the axial direction. One end portion of the actuator unit AU is connected to the link LS via a ball joint JL. The housing 1 is connected to the retaining portion RS via a ball joint JA. An actuator 3 drives the rod 2 so as to drive a portion of the rear axle RA between the retaining portion RS and the link LS to expand and contract. More specifically, an electric motor 3a, which is a component of the actuator 3, is controlled by a controller 4. After the speed of the rotational output from the electric motor 3a is reduced by a speed reducing mechanism 3b, the rotational output is converted into a linear movement of the rod 2 via the linear motion mechanism 3c. In the rear wheel steering apparatus according to the embodiment, the electric motor 3a is a brushless motor. The ball joint JA serves as the first connecting member and the ball joint JL serves as the second connecting member.

In the rear wheel steering apparatus according to the embodiment, the housing 1 includes a housing 1a mainly accommodating components of the actuator 3, for example, the electric motor 3a, and a housing 1b mainly accommodating components of the controller 4, for example, the electronic circuit board 40. A connecting cover 11 is connected to a tubular body 10, which is a component composing the housing 1a. In addition, the case 12, which is a component of the housing 1b, having opening portions in the upward-downward directions and in the axial directions is connected to the tubular body 10. A cover body 15 and a cover body 16 are connected to the opening portions in the upward-downward directions. In the rear wheel steering apparatus according to the embodiment, the housing 1 is made of metal. The connecting cover 11 and the case 12 are made of aluminum. The tubular body 10, the cover body 15, and the cover body 16 are made of iron.

Figure 14:
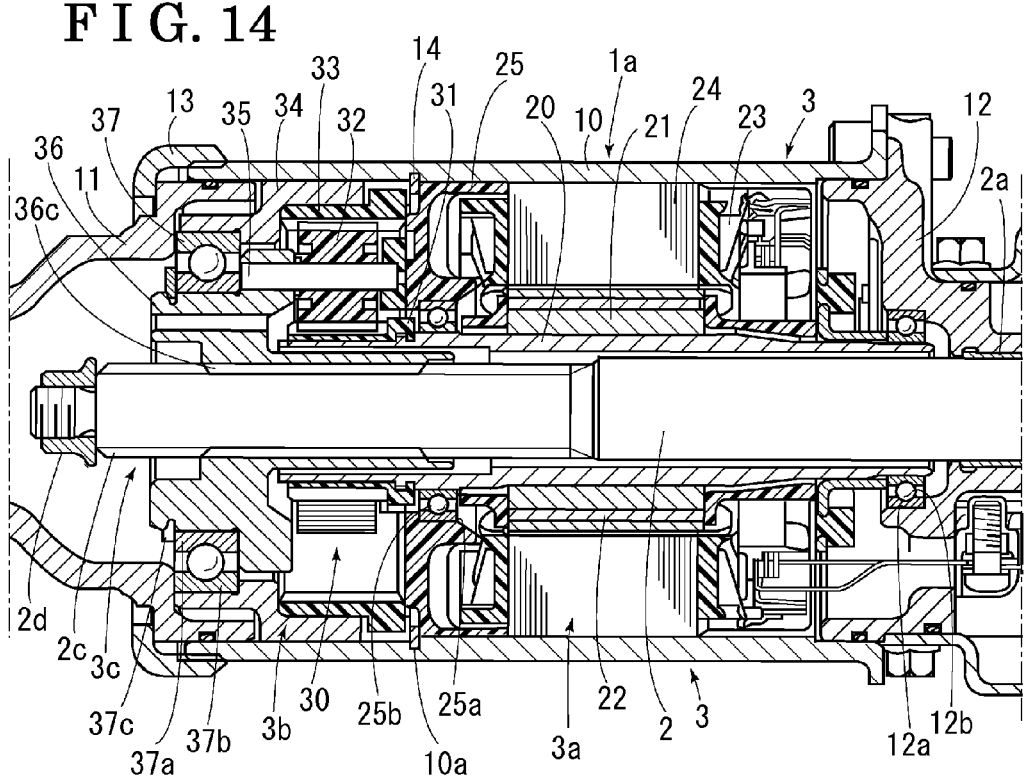
FIG. 14 is an axial direction cross-sectional view drawing illustrating the rear wheel steering apparatus according to the embodiment in which an actuator portion is enlarged.

FIG. 14 illustrates enlarged view of the configuration of the actuator 3. A stator 24 is press fitted to the tubular body 10 and retained thereat in a state where a coil 23 is wound around the stator 24. A hollow rotation shaft 20 serves as the output shaft of the electric motor 3a. The hollow rotation shaft 20 is rotatably supported to an inner diameter portion 25a of a motor cover 25, which is inserted into the tubular body 10, via a bearing 25b. The inner diameter portion 25a is formed in an annular form. In addition, the hollow rotation shaft 20 is rotatably supported to an annular groove 12a that is formed on the case 12 via a bearing 12b. A core 21, which is a component forming a rotor of the electric motor 3a, is press fitted to the hollow rotation shaft 20 and retained at an intermediate portion of the hollow rotation shaft 20 in the axial direction. Permanent magnets 22 separated by equal distance are circumferentially disposed on the core 21.

In addition, the rod 2 is coaxially disposed in the hollow rotation shaft 20 and supported to the hollow rotation shaft 20 so as to be linearly movable in the axial direction relative to the housing 1 and so as to be restrained from rotating relative to the housing 1. A bush 2a and a bush 2b are disposed between the rod 2 and the support portion 12s for reducing sliding resistance so as to smoothly move the rod 2 in the axial direction of the rod 2. The rear wheel steering apparatus according to the embodiment is a cantilever expansion-contraction mechanism. Accordingly, the bush 2a and the bush 2b are not required to serve as bearings for an axial direction displacement mechanism having both end support structure.

In the rear wheel steering apparatus according to the embodiment, the speed reducing mechanism 3b is formed by a planetary gear mechanism 30. In the speed reducing mechanism 3b, a sun gear 31, which is an external gear, is integrally connected to the hollow rotation shaft 20 and rotatably supported together with the hollow rotation shaft 20. A ring gear 33, which is an internal gear, is fixed to a holder 34, which is a tubular retaining member. Planetary gears 32, each of which is an external gear, mesh with the sun gear 31 and the ring gear 33. The planetary gears 32 are disposed so as to rotate around the sun gear 31. As a carrier for rotatably supporting the planetary gears 32 via pins 35, the nut member 36 is rotatably supported to the holder 34 via a bearing 37. The bearing 37 is a ball bearing. An inner ring 37a of the bearing 37 fits to the nut member 36. In addition, the outer ring 37b of the bearing 37 fits to the holder 34. The bearing 37 is retained on the nut member 36 with a spacer 37c formed in a C-form.

In the rear wheel steering apparatus according to the embodiment, the holder 34 and the pin 35 are made of metal, for example, iron. The sun gear 31, the planetary gears 32 and the ring gear 33 are made of synthetic resin. The sun gear 31 is integrated with the hollow rotation shaft 20, which is made of metal. The ring gear 33 is supported by the holder 34 in a state where the ring gear 33 is restrained from rotating relative to the holder 34. The holder 34 is supported by the tubular body 10 in a state where the holder 34 is restrained from rotating relative to the tubular body 10. As FIG. 14 illustrates, a snap ring 14 is retained at an annular groove 10a formed in the tubular body 10. In a state where the outer ring 37b of the bearing 37 and the holder 34 are sandwiched between the annular side surface of the snap ring 14 and the annular open end surface of the connecting cover 11, a lock nut 13 formed in an annular form is threadably mounted to the threaded portion formed at an open end of the tubular body 10 positioned in the direction of the speed reducing mechanism 3b, which is leftward in FIG. 14, so as to fasten the tubular body 10 and the connecting cover 11. By the pressing force directed in the axial direction, which is generated as a result of threadably mounting the lock nut 13, the outer ring 37b of the bearing 37 and the holder 34 are rigidly sandwiched between the snap ring 14 and the connecting cover 11. As a result, the holder 34 is restrained from rotating relative to the tubular body 10.

In the rear wheel steering apparatus according to the embodiment, an external thread portion 2c, which is formed with trapezoidal threads extending for a predetermined length in the axial direction on the external circumferential surface of one end of the rod 2, and an internal thread portion 36c, which is formed on the internal circumferential surface of the nut member 36, are disposed so as to screw together. Accordingly, the linear motion mechanism 3c is configured with the nut member 36 and the rod 2. In order to prevent the rod 2 from falling off, a nut 2d is screwed on an edge portion of the external thread portion 2c. The load in the axial direction that may be applied on rod 2, which is supported as described above, is absorbed by the tubular body 10 and the connecting cover 11 via the nut member 36, the bearing 37, the holder 34, and the snap ring 14.

Figure 15:
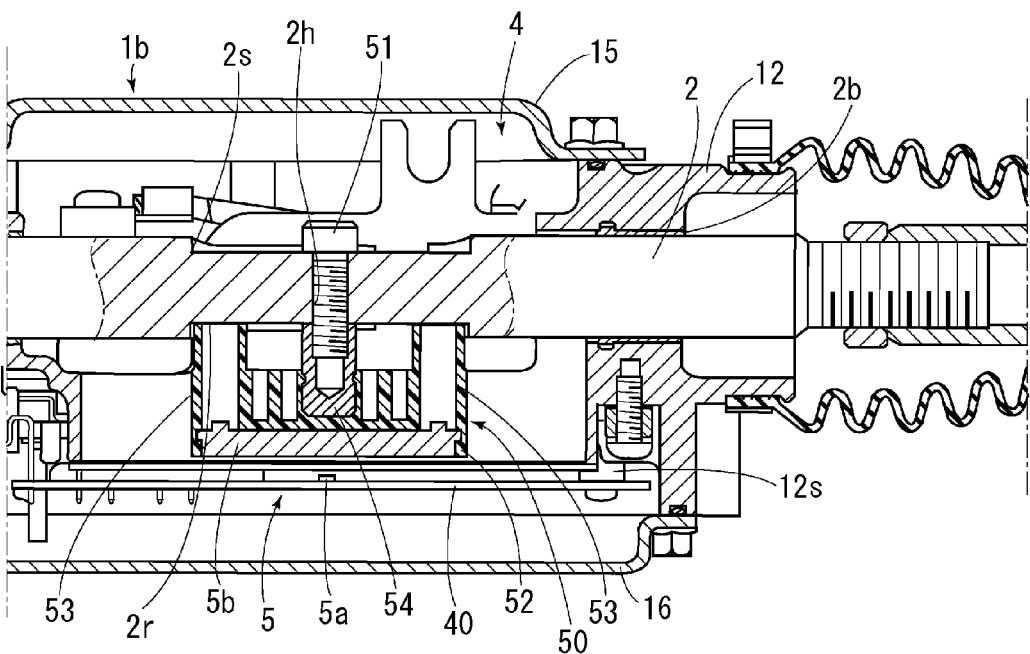
FIG. 15 is an axial direction cross-sectional view drawing illustrating the rear wheel steering apparatus according to the embodiment in which a controller portion is enlarged.

FIG. 15 illustrates the housing 1b that houses a controller 4 including the electronic circuit board 40, which is a component of an electronic control apparatus, and the displacement sensor 5a and the magnet block 50, which are components of the displacement detection apparatus 5. In the displacement detection apparatus 5 illustrated in FIG. 15, the displacement sensor 5a is retained on the electronic circuit board 40. Note that, the displacement detection apparatus 5 in FIG. 15 is illustrated in an upside down position compared to the displacement detection apparatus 5 illustrated in FIG. 1. Other components are similar to those illustrated in FIGS. 1 through 12 and descriptions in detail of those will be omitted. The magnet block 50 serves to detect displacement of the rod 2 when the rod 2 moves linearly. In addition, the magnet block 50 serves to restrain the rod 2 from rotating.

In the rear wheel steering apparatus according to the embodiment, the actuator 3 drives the hollow rotation shaft 20 with the electric motor 3a, which in turn drives the nut member 36 to rotate after the rotational force of the hollow rotation shaft 20 is reduced in speed by the speed reducing mechanism 3b of the planetary gear mechanism 30, so that linear motion mechanism 3c converts the rotational motion of the nut member 36 to the linear motion of the rod 2. As a result, as described earlier, the portion of the rear axle RA between the retaining portion RS and the link LS is driven to expand and contract so as to adjust the steering angle of the rear wheels RL, RR.

According to an aspect of this disclosure, a displacement detection apparatus 5 for a linear motion mechanism 3c includes a nut member 36, a rod 2 that screws through the nut member 36, the rod 2 including elongate grooves 2r, 2s elongating in an axial direction of the rod 2 and a through hole 2h extending between the elongate grooves 2r, 2s, the linear motion mechanism 3c converting rotational movement of the nut member 36 into linear movement of the rod 2, a permanent magnet 5b disposed parallel to the rod 2, a magnet block 50 made of synthetic resin and including a retaining portion 52 holding the permanent magnet 5b, a pair of leg portions 53 extending from ends of the retaining portion 52 that are spaced apart in the axial direction, and a nut 54 made of metal that is insert-molded at an intermediate position between the pair of leg portions 53, and a displacement sensor 5a disposed opposing to the permanent magnet 5b and detecting displacement of the rod 2 in the axial direction. The pair of leg portions 53 and the nut 54 of the magnet block 50 are disposed in the elongate groove 2r of the rod 2 and the magnet block 50 is fixed to the rod 2 by a bolt 51 screwed to the nut 54, the bolt 51 penetrating through the through hole 2h extending through the rod 2.

Accordingly, the magnet block 50 serves to detect the displacement of the rod 2 in the axial direction when the rod 2 moves linearly and in addition serves to restrain the rod 2 from rotating, so that the displacement detection apparatus 5 for the linear motion mechanism 3c may be decreased in size and weight. Additionally, the pair of leg portions 53 and the nut 54 are disposed in the elongate groove 2r of the rod 2 so as to fix the magnet block 50 on the rod 2 so that the magnet block 50 is reliably retained to the rod 2 without the magnet block 50 rotating with the nut 54 as the center of rotation. Accordingly, a single set of the bolt 51 and the nut 54 alone serves to fasten the magnet block 50 to the rod 2. Having small number of components, the magnet block 50 is easily mounted so that the cost of the displacement detection apparatus 5 may be decreased.

According to another aspect of this disclosure, the displacement detection apparatus 5 for the linear motion mechanism 3c further includes a case 12 including a pair of standing wall portions 12w extending parallel to an axis of the rod 2. The retaining portion 52 of the magnet block 50 is disposed between the pair of standing wall portions 12w to be retained thereat. The rod 2 is supported by the magnet block 50 to be restrained from rotating relative to the case 12.

Accordingly, the process of mounting the displacement detection apparatus 5 becomes easier and the cost of the displacement detection apparatus 5 may be decreased.

According to further aspect of this disclosure, the magnet block 50 of the displacement detection apparatus 5 for the linear motion mechanism 3c includes protruding portions 55 on side surfaces of the magnet block 50 at a portion where the nut 54 is insert-molded. The protruding portions 55 are fitted between the pair of standing wall portions 12w.

Accordingly, the load that the magnet block 50 is required to withstand for restraining the rod 2 from rotating relative to the standing wall portions 12w concentrates at the portion of the nut 54, which is made of metal. Accordingly, the retaining portion 52 and the permanent magnet 5b are prevented from receiving a large load, so that an accurate detection precision may be maintained.

According to another aspect of this disclosure, the pair of leg portions 53 of the magnet block 50 of The displacement detection apparatus 5 for the linear motion mechanism 3c are in contact with an inner side surface 2i of the elongate groove 2r provided on the rod 2.

Accordingly, the magnet block 50 is reliably retained parallel to the rod 2 without the magnet block 50 rotating with the nut 54 as the center of rotation. Accordingly, a single set of the bolt 51 and the nut 54 alone serves to fasten the magnet block 50 to the rod 2. Having small number of components, the magnet block 50 is easily mounted so that the cost of the displacement detection apparatus 5 may be decreased.

According to further aspect of this disclosure, a rear wheel steering apparatus for a vehicle includes a housing 1 that connects to a suspension mechanism for supporting rear wheels RL, RR of the vehicle via a first connecting member (a ball joint JA) and a second connecting member (a ball joint JL), an electric motor 3a housed in a tubular body 10 composing a portion of the housing 1, a speed reducing mechanism 3b housed in the tubular body 10 and reducing speed of an output from the electric motor 3a, a nut member 36 that connects to the speed reducing mechanism 3b and rotating, a rod 2 that screws through the nut member 36, the rod 2 that connects to the second connecting member (the ball joint JL), the linear motion mechanism 3c converting rotational movement of the nut member 36 into linear movement of the rod 2, a case 12 composing a portion of the housing 1, the case 12 disposed to surround the rod 2 and fixedly connecting to the tubular body 10, the rod 2 including elongate grooves 2r, 2s elongating in an axial direction of the rod 2 and a through hole 2h extending between the elongate grooves 2r, 2s, a permanent magnet 5b disposed parallel to the rod 2, and a magnet block 50 made of synthetic resin and including a retaining portion 52 holding the permanent magnet 5b, a pair of leg portions 53 extending from ends of the retaining portion 52 that are spaced apart, and a nut 54 made of metal that is insert-molded at an intermediate position between the pair of leg portions 53. The pair of leg portions 53 and the nut 54 of the magnet block 50 are disposed in the elongate groove 2r of the rod 2 and the magnet block 50 is fixed to the rod 2 by a bolt 51 screwed to the nut 54, the bolt 51 penetrating through the through hole 2h extending through the rod 2.

Accordingly, the magnet block 50 serves to detect the displacement of the rod 2 in the axial direction when the rod 2 moves linearly and in addition serves to restrain the rod 2 from rotating so that the rear wheel steering apparatus as a whole may be decreased in size and weight. Additionally, the pair of leg portions 53 and the nut 54 are disposed in the elongate groove 2r of the rod 2 so as to fix the magnet block 50 on the rod 2 so that the magnet block 50 is reliably retained to the rod 2 without the magnet block 50 rotating with the nut 54 as the center of rotation. Accordingly, a single set of the bolt 51 and the nut 54 alone serves to fasten the magnet block 50 to the rod 2. Having small number of components, the magnet block 50 is easily mounted so that the cost of the rear wheel steering apparatus as a whole may be decreased.

According to another aspect of this disclosure, the case 12 of the rear wheel steering apparatus for a vehicle includes therein a pair of standing wall portions 12w extending parallel to an axis of the rod 2. The retaining portion 52 of the magnet block 50 is disposed between the pair of standing wall portions 12w to be retained thereat. The rod 2 is supported by the magnet block 50 to be restrained from rotating relative to the housing 1.

Accordingly, the process of mounting the displacement detection apparatus 5 becomes easier and the cost of the rear wheel steering apparatus may be decreased.

According to further aspect of this disclosure, the magnet block 50 of the rear wheel steering apparatus for a vehicle includes protruding portions 55 on side surfaces of the magnet block 50 at a portion where the nut 54 is insert-molded. The protruding portions 55 are fitted between the pair of standing wall portions 12w.

Accordingly, the load that the magnet block 50 is required to withstand for restraining the rod 2 from rotating relative to the standing wall portions 12w concentrates at the portion of the nut 54, which is made of metal. Accordingly, the retaining portion 52 and the permanent magnet 5b are prevented from receiving a large load, so that an accurate detection precision may be maintained.

According to another aspect of this disclosure, the pair of leg portions 53 of the magnet block 50 of the rear wheel steering apparatus for a vehicle are in contact with an inner side surface 2i of the elongate groove 2r provided on the rod 2.

Accordingly, the magnet block 50 is reliably retained parallel to the rod 2 without the magnet block 50 rotating with the nut 54 as the center of rotation. Accordingly, a single set of the bolt 51 and the nut 54 alone serves to fasten the magnet block 50 to the rod 2. Having small number of components, the magnet block 50 is easily mounted so that the cost of the displacement detection apparatus 5 may be decreased.

According to further aspect of this disclosure, a displacement detection apparatus 5 for a linear motion mechanism 3*c* includes a nut member 36, a rod 2 that screws through the nut member 36, the linear motion mechanism 3*c* converting rotational movement of the nut member 36 into linear movement of the rod 2, an electronic circuit board 40 configured to be mounted with plural elements, a support base plate 46 supporting the electronic circuit board 40 at a position spaced by a predetermined distance relative to the support base plate 46, a permanent magnet 5*b* disposed parallel to the rod 2, and a displacement sensor 5*a* disposed at a central portion of the electronic circuit board 40 within a region facing a path of movement of the permanent magnet 5*b*, the displacement sensor 5*a* detecting magnetic flux changes of the permanent magnet 5*b*. The electronic circuit board 40 is fixed to the support base plate 46 at a position close to the displacement sensor 5*a*.

Accordingly, the displacement sensor 5*a* is appropriately supported on the electronic circuit board 40 so that the displacement detection apparatus 5 for the linear motion mechanism 3*c* may be decreased in size, weight, and cost.

According to another aspect of this disclosure, the displacement sensor 5*a* of the displacement detection apparatus 5 for the linear motion mechanism 3*c* includes plural leads 5*ax* extending parallel to each other in a predetermined direction. In addition, the electronic circuit board 40 includes plural lands 47 extending parallel to each other in a predetermined direction. The plural leads 5*ax* of the displacement sensor 5*a* are bonded to the plural lands 47. The electronic circuit board 40 is screw-fixed to the support base plate 46 in a state where the plural leads 5*ax* extend in the direction perpendicular to the moving direction ST of the permanent magnet 5*b*.

Accordingly, the displacement sensor 5*a* may be easily and appropriately attached to the electronic circuit board 40 with a minimum detection error so that an accurate detection precision of the displacement sensor 5*a* may be maintained.

According to further aspect of this disclosure, a rear wheel steering apparatus for a vehicle includes a housing 1 that connects to a suspension mechanism for supporting rear wheels RL, RR of the vehicle via a first connecting member (a ball joint JA) and a second connecting member (a ball joint JL), an electric motor 3*a* housed in the tubular body 10 composing a portion of the housing 1, a speed reducing mechanism 3*b* housed in the tubular body 10 and reducing speed of an output from the electric motor 3*a*, a nut member 36 that connects to the speed reducing mechanism 3*b* and rotating, a rod 2 that screws through the nut member 36, the rod 2 that connects to the second connecting member (the ball joint JL), the linear motion mechanism 3*c* converting rotational movement of the nut member 36 into linear movement of the rod 2, a case 12 composing a portion of the housing 1, the case 12 disposed to surround the rod 2 and fixedly connecting to the tubular body 10, an electronic circuit board 40 disposed in the case 12, the electronic circuit board 40 configured to be mounted with plural elements, a support base plate 46 supporting the electronic circuit board 40 at a position spaced by a predetermined distance relative to the support base plate 46, a permanent magnet 5*b* disposed parallel to the rod 2, and a displacement sensor 5*a* disposed at a central portion of the electronic circuit board 40 within a region facing a path of movement of the permanent magnet 5*b*, the displacement sensor 5*a* detecting magnetic flux changes of the permanent magnet 5*b*. The electronic circuit board 40 is fixed to the support base plate 46 at a position close to the displacement sensor 5*a*.

Accordingly, the displacement sensor 5*a* is appropriately supported on the electronic circuit board 40 so that the displacement detection apparatus 5 of the linear motion mechanism 3*c* may be decreased in size, weight, and the rear wheel steering apparatus as a whole may be decreased in cost.

According to another aspect of this disclosure, the displacement sensor 5*a* of the rear wheel steering apparatus for a vehicle includes plural leads 5*ax* extending parallel to each other in a predetermined direction. In addition, the electronic circuit board 40 includes plural lands 47 extending parallel to each other in a predetermined direction. The plural leads 5*ax* of the displacement sensor 5*a* are bonded to the plural lands 47. The electronic circuit board 40 is screw-fixed to the support base plate 46 in a state where the plural leads 5*ax* extend in a direction perpendicular to a moving direction ST of the permanent magnet 5*b*.

Accordingly, the displacement sensor 5*a* may be easily and appropriately attached to the electronic circuit board 40 with a minimum detection error so that an accurate detection precision of the displacement sensor 5*a* may be maintained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A displacement detection apparatus for a linear motion mechanism, comprising:
    a nut member;
    a rod that screws through the nut member, the rod including elongate grooves elongating in an axial direction of the rod and a through hole extending between the elongate grooves;
    the linear motion mechanism converting rotational movement of the nut member into linear movement of the rod;
    a permanent magnet disposed parallel to the rod;
    a magnet block made of synthetic resin and including a retaining portion holding the permanent magnet, a pair of leg portions extending from ends of the retaining portion that are spaced apart, and a nut made of metal that is insert-molded at an intermediate position between the pair of leg portions; and
    a displacement sensor disposed opposing to the permanent magnet and detecting displacement of the rod in the axial direction, wherein
    the pair of leg portions and the nut of the magnet block are disposed in one of the elongate grooves of the rod, and the magnet block is fixed to the rod by a bolt screwed to the nut, the bolt penetrating through the through hole extending through the rod.

2. The displacement detection apparatus for the linear motion mechanism according to claim 1, further comprising:
    a case including a pair of standing wall portions extending parallel to an axis of the rod, wherein
    the retaining portion of the magnet block is disposed between the pair of standing wall portions to be retained thereat, and wherein the rod is supported by the magnet block to be restrained from rotating relative to the case.

3. The displacement detection apparatus for the linear motion mechanism according to claim 2, wherein
the magnet block includes protruding portions on side surfaces of the magnet block at a portion where the nut is insert-molded, wherein
the protruding portions are fitted between the pair of standing wall portions.

4. The displacement detection apparatus for the linear motion mechanism according to claim 1, wherein
the pair of leg portions of the magnet block are in contact with an inner side surface of the one of the elongate grooves provided on the rod.

5. A rear wheel steering apparatus for a vehicle, comprising:
a housing that connects to a suspension mechanism for supporting rear wheels of the vehicle via a first connecting member and a second connecting member;
an electric motor housed in a tubular body composing a portion of the housing;
a speed reducing mechanism housed in the tubular body and reducing speed of an output from the electric motor;
a nut member that connects to the speed reducing mechanism and rotating;
a rod that screws through the nut member, wherein the rod connects to the second connecting member;
a linear motion mechanism converting rotational movement of the nut member into linear movement of the rod;
a case composing a portion of the housing, the case disposed to surround the rod and fixedly connecting to the tubular body;
the rod including elongate grooves elongating in an axial direction of the rod and a through hole extending between the elongate grooves;
a permanent magnet disposed parallel to the rod; and
a magnet block made of synthetic resin and including a retaining portion holding the permanent magnet, a pair of leg portions extending from ends of the retaining portion that are spaced apart in the axial direction, and a nut made of metal that is insert-molded at an intermediate position between the pair of leg portions, wherein
the pair of leg portions and the nut of the magnet block are disposed in one of the elongate grooves of the rod, and the magnet block is fixed to the rod by a bolt screwed to the nut, the bolt penetrating through the through hole extending through the rod.

6. The rear wheel steering apparatus for a vehicle according to claim 5, wherein
the case includes therein a pair of standing wall portions extending parallel to an axis of the rod, wherein
the retaining portion of the magnet block is disposed between the pair of standing wall portions to be retained thereat, and wherein
the rod is supported by the magnet block to be restrained from rotating relative to the housing.

7. The rear wheel steering apparatus for a vehicle according to claim 6, wherein
the magnet block includes protruding portions on side surfaces of the magnet block at a portion where the nut is insert-molded, and wherein
the protruding portions are fitted between the pair of standing wall portions.

8. The rear wheel steering apparatus for a vehicle according to claim 5, wherein
the pair of leg portions of the magnet block are in contact with an inner side surface of the one of the elongate grooves provided on the rod.

\* \* \* \* \*